Dec. 7, 1948.　　　　C. W. LANTER　　　　2,455,786

HANDLE FOR PORTABLE BLOWERS

Filed March 8, 1946

Inventor:
Clarence W. Lanter
By: Lee J. Gary
Attorney

Patented Dec. 7, 1948

2,455,786

UNITED STATES PATENT OFFICE 2,455,786

HANDLE FOR PORTABLE BLOWERS

Clarence W. Lanter, Bartlett, Ill., assignor to Breuer Electric Mfg. Company, Chicago, Ill., a corporation of Illinois Application March 8, 1946, Serial No. 653,212

3 Claims. (Cl. 173—322)

This invention relates to improvements in handles for portable blowers and the like, and contemplates the provision of a handle having a strain relief chamber formed at one end thereof for detachable engagement with one end of an insulated electrical cable, and the other end of the handle formed to receive a switch.

This invention further contemplates the provision of a handle for blowers and the like in which the blower operating switch is positioned for manipulation by a thumb or finger of the operator's hand employed for carrying the blower.

This invention further contemplates the provision of a handle for portable blowers and the like having a hollow hand gripping portion adapted to enclose the ends of electrical wires to be connected between the cable and the switch.

This invention further contemplates the provision of a handle for portable blowers in which the hand gripping portion is partly formed by a detachably mounted cap which permits access to the interior of the handle during assembly of an electrical cable and switch therewith, and for electrically connecting the ends of the electrical wires extending between the cable and the switch.

This invention embodies other novel features, details of construction and arrangement of parts which are hereinafter set forth in the specification and claims and illustrated in the accompanying drawing wherein:

Figure 1:
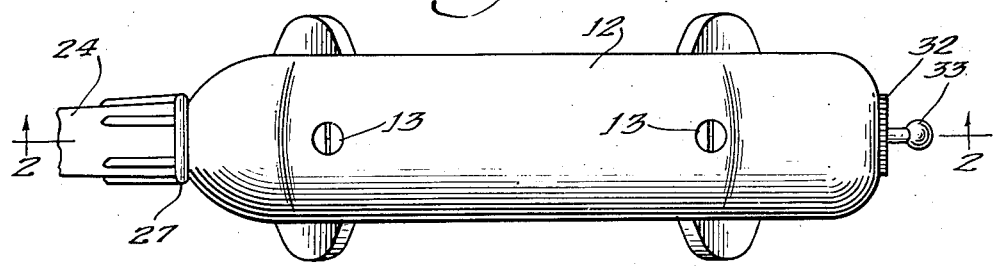
Fig. 1 is a plan view showing a handle embodying features of this invention.
Figure 2:
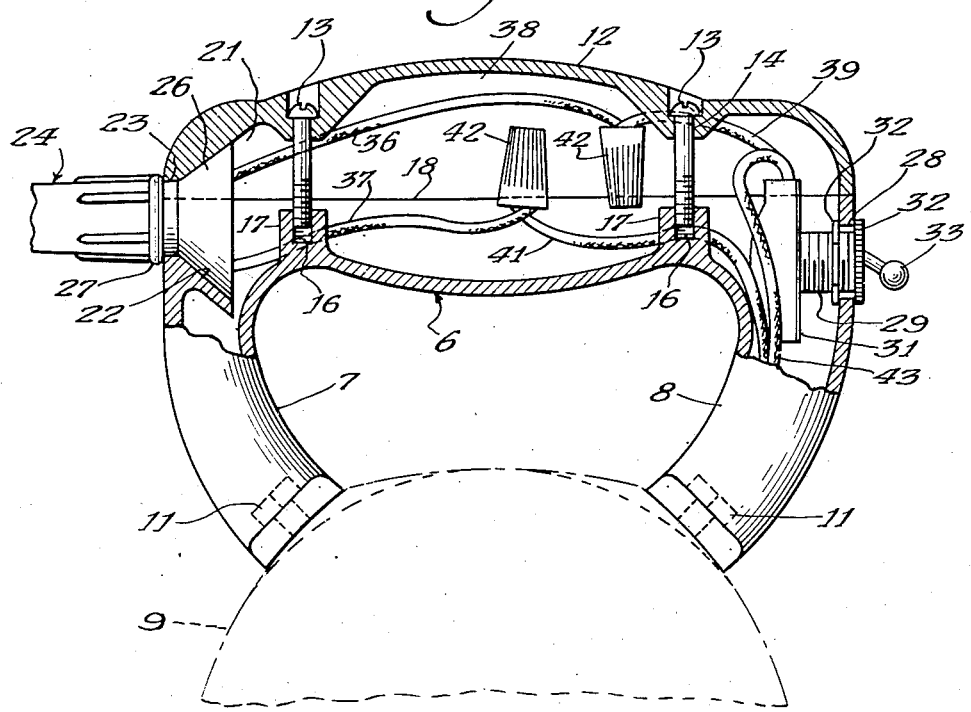
Fig. 2 is a side elevational view, partly in section, showing the handle and the manner of mounting a cable and switch thereon, the blower being partly shown in dotted outline.

Referring now to the drawing for a better understanding of this invention, the handle is shown as comprising a concavo-convex hand gripping portion 6 having a pair of hollow support arms 7 and 8 formed thereon for detachable engagement with a blower 9, or the like, by means of screws 11. A concavo-convex cap 12 is detachably connected to the hand gripping portion 6 by means of screws 13 which extend through counterbored apertures 14 formed in the cap 12 for engagement in threaded openings 16 provided in annular bosses 17. As illustrated in Fig. 2, the hand gripping portion 6 and cap 12 are formed for abutting engagement along a line 18 on diametrically opposed sides of the handle to insure a smooth exterior gripping surface for the handle.

The hollow arm 7 and one end of the cap 12 are formed to define a strain relief chamber 21 having a frustro-conical wall surface 22 converging toward an aperture 23 formed to snugly receive an electrical cable 24. The end of the cable 24 is preferably formed frustro-conical at 26 for snug engagement with the wall 22 of the strain relief chamber 21, and an annular bead 27 is also preferably formed on the cable to resist displacement of the cable inwardly through the aperture 23.

An aperture 28 is formed in the front side of the hollow arm 8 to receive the threaded stem 29 of a suitable electrical switch 31. The switch is secured against displacement by means of a pair of nuts 32 threaded onto the stem 29 for clamping engagement against opposite sides of the front wall portion of the hollow arm 8. A manually operable handle 33 is disposed for pivotal movement longitudinally of the hollow arm 8 for opening or closing an electrical circuit through the switch 31. As the switch 31 may be of any well known form construction having a handle 33 movable longitudinally of the arm 8 for opening and closing a circuit, it is not believed necessary to amplify the description of same further.

Leads 36 and 37 of the cable 24 extend inwardly through the handle to an intermediate chamber 38, defined by the hand gripping portion 6 and cap 12, for electrical connection to leads 39 and 41, respectively. The leads are connected in the usual manner by twisting their adjacent ends together; and, if desired, an insulated cap 42, of well known construction, may be provided for threaded engagement onto the exposed twisted ends of the leads. The lead 41 is connected at its other end to one terminal of an electric motor, not shown, forming part of the blower 9, and a return lead 43 extends from another terminal of the motor to a terminal, not shown, within the switch 31. The lead 39 extends from its point of connection with the lead 36 for connection to a second terminal, not shown, provided within the switch 31. The switch 31 acts in the usual manner to open or close the circuit between a source of electrical current and the electric motor within the blower.

When the handle is divided along the line 18 to provide a hand gripping portion 6 and a cap portion 12, it will be noted that the cable 24 and switch 31 may readily be mounted in operative position within the handle; and that the wires 36 and 37 may also be readily connected to the wires 39 and 41, respectively. By splitting the handle along the line 18 on diametrically opposed sides, a flush smooth outer surface is provided throughout the circumference of the handle.

An important feature of this invention resides in the positioning of the switch 31 adjacent the forward end of the handle to facilitate starting and stopping of the electric motor within the blower 9 by means of a thumb or finger of the user. It will be noted that the operator may carry the blower and also operate the switch with one hand.

While this invention has been shown in but one form, it is obvious to those skilled in the art that it is not so limited but is susceptible of various changes and modifications without departing from the spirit and scope of the claimed invention.

I claim as my invention:

1. A handle for a portable blower and the like, comprising a concavo-convex hand gripping portion, a pair of hollow arms extending inwardly from the front and rear ends from said hand gripping portion for engagement with a blower, a concavo-convex cap secured to said hand gripping portion to enclose same and also to enclose the outer ends of said hollow arms, said cap and one of said hollow arms forming a strain relief chamber having a frustro-conical wall surface converging toward an aperture to snugly receive and engage an electrical cable having a frustro-conical portion.

2. A handle for a portable blower and the like, comprising a concavo-convex hand gripping portion, a pair of hollow arms extending inwardly from the front and rear ends from said hand gripping portion for engagement with a blower, a concavo-convex cap secured to said hand gripping portion to enclose same and also to enclose the outer ends of said hollow arms, said rear arm and cap forming a cable aperture and a strain relief chamber to receive the end of an electrical cable, said strain relief chamber having a frustro-conical wall surface converging toward and terminating at said cable aperture.

3. A handle for a portable blower and the like, comprising a concavo-convex hand gripping portion, a pair of hollow arms extending inwardly from the front and rear ends from said hand gripping portion for engagement with a blower, a concavo-convex cap secured to said hand gripping portion to enclose same and also to enclose the outer ends of said hollow arms, said rear arm and cap forming a cable aperture and a strain relief chamber to receive the end of an electrical cable, said strain relief chamber having a frustro-conical wall surface converging toward and terminating at said cable aperture, and means for securing said cap to said hand gripping portion to clamp an electrical cable against axial movement within said strain relief chamber and cable aperture.

CLARENCE W. LANTER.

REFERENCES CITED

The following references are of record in the file of this patent:

UNITED STATES PATENTS

| Number | Name | Date |
|---|---|---|
| 1,382,821 | Coates | June 28, 1921 |
| 1,761,059 | Van Norman et al. | June 3, 1930 |
| 1,912,115 | Allen | May 30, 1933 |
| 2,023,902 | Riebel, Jr. | Dec. 10, 1935 |
| 2,055,867 | Kuehne | Sept. 29, 1936 |
| 2,114,102 | Collins | Apr. 12, 1938 |
| 2,141,971 | Desoutter | Dec. 27, 1938 |
| 2,373,248 | Lucia | Apr. 10, 1945 |